United States Patent [19]

Yoshida

[11] Patent Number: 4,799,240

[45] Date of Patent: Jan. 17, 1989

[54] CLOCK SYNCHRONIZING CIRCUIT INCLUDING A VOLTAGE CONTROLLED OSCILLATOR

[75] Inventor: Yasuharu Yoshida, Tokyo, Japan

[73] Assignee: NEC Corporation, Japan

[21] Appl. No.: 863,771

[22] Filed: May 15, 1986

[30] Foreign Application Priority Data

May 28, 1985 [JP] Japan ................. 60-114518

[51] Int. Cl.$^4$ .................. H04L 7/02; H03D 3/24
[52] U.S. Cl. .................. 375/110; 375/119; 375/120
[58] Field of Search ............ 375/106, 108, 113, 119, 375/120, 110

[56] References Cited

U.S. PATENT DOCUMENTS

| | | | |
|---|---|---|---|
| 3,010,073 | 11/1961 | Melas | 375/110 X |
| 3,158,864 | 11/1964 | Lehan | 375/110 X |
| 3,290,603 | 12/1966 | Rabow | 455/259 |
| 3,459,892 | 8/1969 | Shagena et al. | 375/110 X |
| 3,551,817 | 12/1970 | Kovar | 375/110 X |
| 3,804,518 | 4/1974 | Meyr | 356/28 |
| 3,867,835 | 2/1975 | Button | 73/3 |
| 4,542,351 | 9/1985 | Okada | 375/120 |
| 4,592,076 | 5/1986 | El-Banna | 375/108 |
| 4,615,041 | 9/1986 | Koskinen | 375/106 X |
| 4,648,133 | 3/1987 | Vilnrotter | 375/120 |
| 4,654,864 | 3/1987 | Ichiyosi | 375/120 |
| 4,679,003 | 7/1987 | Sagawa et al. | 375/120 |

*Primary Examiner*—Stephen C. Buczinski
*Assistant Examiner*—Linda J. Wallace
*Attorney, Agent, or Firm*—Laff, Whitesel, Conte & Saret

[57] ABSTRACT

A clock synchronizing circuit separates and filters a clock component from a digital input wave. The output of the circuit is sampled to produce a two-level signal. A voltage controlled oscillator generates a clock signal having a phase and a frequency which is controlled responsive to the two-level signal.

21 Claims, 6 Drawing Sheets

CLOCK SYNCHRONIZING CIRCUIT INCLUDING A VOLTAGE CONTROLLED OSCILLATOR

BACKGROUND OF THE INVENTION

The present invention relates to a clock synchronizing circuit and, more particularly, to a clock synchronizing circuit for use with a demodulator in a digital carrier wave transmission system.

In a demodulator applicable to a digital carrier wave transmission system, a clock signal must be provided in order that a demodulated analog signal may be sampled at optimum points and thereby converted to a digital signal, i.e., a regenerated digital signal. A prior art clock synchronizing circuit which is adapted for recovery of the clock signal comprises a clock separating means or clock component producing means including a tank circuit, a limiter, a phase comparator, and a voltage controlled oscillator (VCO). The clock separating means separates or produces a clock component from a digital modulated wave (e.g. PSK wave or QAM wave) or a demodulated analog signal. The limiter is adapted to limit the amplitude variation of the separated clock component. The phase comparator compares an output of the limiter and an output of the VCO in terms of phase, producing an error voltage which is proportional to the phase difference. Controlled by the error voltage, the VCO varies its oscillation frequency until the error voltage becomes minimum, that is, until a clock signal recovered by the VCO is brought into synchronism with the separated clock component. The recovered clock signal which is synchronized, as stated, is used to sample the previously mentioned demodulated signal.

The prior art clock synchronizing circuit requires the limiter thereof to be furnished with, among other things, a small amount of AM/PM conversion. It is difficult to realize a limiter with a small amount of AM/PM conversion, at the present stage of the art. Although such a limiter may be implemented with a high-speed IC gate, it is expensive and needs precise and difficult to make adjustments.

SUMMARY OF THE INVENTION

It is, therefore, an object of the present invention to provide a clock synchronization circuit which is capable of producing a clock signal with a minimum of jitter and without resorting to a limiter circuit, while reducing the circuit size and, therefore, its costs.

A clock synchronizing circuit of the present invention comprises first means for separating a clock component from a digital modulated wave or a demodulated signal of the digital modulated wave and for filtering the clock components. A second means is provided for sampling the output of the first means responsive to a given clock signal in order to produce a two-level signal. A voltage controlled oscillator means generates the clock signal with a phase and a frequency of the voltage controlled oscillator means controlled by the output of the second means.

BRIEF DESCRIPTION OF THE DRAWINGS

The above and other objects, features and advantages of the present invention will become more apparent from the following detailed description taken with the accompanying drawings, in which.

DETAILED DESCRIPTION OF THE INVENTION

Figure 1:
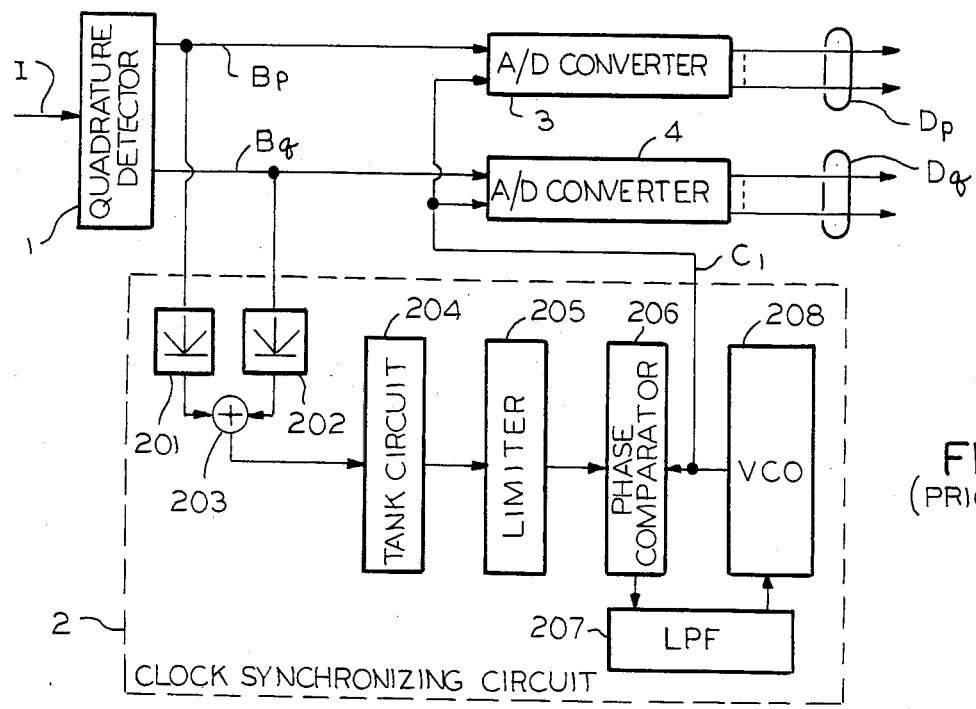
FIG. 1 is a block diagram of a demodulator using a prior art clock synchronizing circuit.

FIG. 1 shows a demodulator using a prior art clock synchronizing circuit 2. As shown, the clock synchronizing circuit 2 is made up of a quadrature detector 1 for coherently detecting a multi-level quadrature modulated IF signal (e.g. QAM wave) I. A reference carrier wave is recovered from signal I to produce baseband signals Bp and Bq. A clock synchronizing circuit 2 recovers a clock signal $C_1$ out of the baseband signals Bp and Bq. Analog-to-digital (A/D) converters 3 and 4 sample and shape, respectively, the baseband signals Bp and Bq in response to the clock signal $C_1$ to produce data signals Dp and Dq.

The clock synchronizing circuit 2 comprises full-wave rectifier 201 and 202 adapted to full-wave rectify the baseband signals Bp and Bq, respectively. An adder 203 mixes the outputs of the rectifiers 201 and 202. A tank circuit (or bandpass filter) narrow-band filters an output of the adder 203. The limiter 205 limits the amplitude of an output of the tank circuit 204. The phase comparator 206 compares the phase of an output of the limiter 205 and the output of the clock signal $C_1$. A low pass filter (LPF) provides for filtering an output of the phase comparator 206, and feeds the filtered signal into a voltage controlled oscillator (VCO) 208.

In operation, the multi-level baseband signals are non-linearly operated by the full-wave rectifiers and other circuits. A separated clock component appears at the output terminal of the adder 203. The tank circuit 204 suppresses, to a certain extent, the jitter which is contained in the clock component. The jitter which is present in the output of the tank circuit 204 consists of an AM component and a PM component. In order that the AM component may be prevented from being converted to a PM component due to an imperfection of the subsequent stage of the circuitry, the limiter 205 is provided for suppressing the AM component. The phase comparator 206 compares the phase of the output of the limiter 205 and the phase of the output of the VCO 208. The output of the phase comparator 206 is applied via the LPF 207 to the VCO 208 to control the output phase of the oscillator, so that the output clock signal $C_1$ from the VCO 208 is phase-locked to the output of the limiter 205.

The prior art clock synchronizing circuit which is constructed and operated, as described above, has the previously stated shortcomings.

Figure 2:
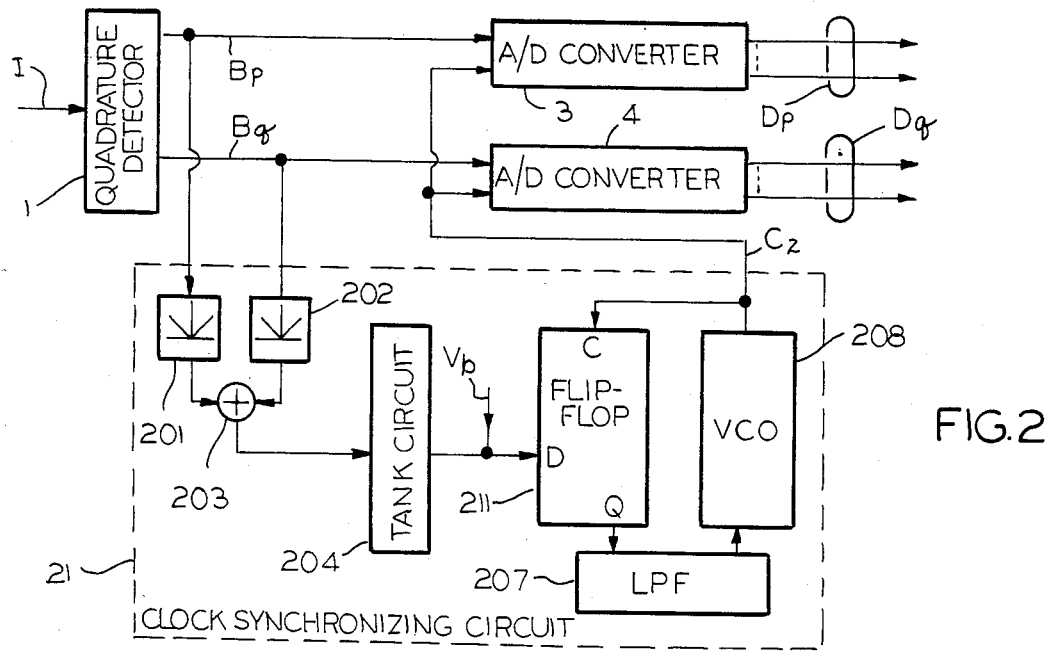
FIG. 2 is a block diagram of a demodulator using a first embodiment of the clock synchronizing circuit in accordance with the present invention.

FIG. 2 shows a demodulator with a clock synchronizing circuit in accordance with a first embodiment of the present invention. In FIG. 2, the structural elements which are the same as those of FIG. 1 are designated by like reference numerals.

The demodulator comprises a quadrature detector 1 for producing baseband signals Bp and Bq responsive to an IF signal I. A clock synchronizing circuit 21, in accordance with the present invention, is adapted to recover a clock signal $C_2$ from the baseband signals Bp and Bq. The A/D converters 3 and 4 are adapted to sample and shape, respectively, the baseband signals Bp and Bq in response to the clock signal $C_2$, thereby producing data signals Dp and Dq.

As shown, the clock synchronizing circuit 21 contains full-wave rectifiers 201 and 202, an adder 203 and a tank circuit 204. A D-type flip-flop 211 has an input terminal D to which a signal prepared by superposing a bias voltage Vb onto an output of the tank circuit 204 is applied. A clock input terminal C receives the clock signal $C_2$. An LPF 207 receives a signal appearing at an output terminal Q of the flip-flop 211. A VCO 208 is adapted to produce the clock signal $C_2$.

The demodulator of FIG. 2 will operate as follows:

The quadrature detector 1 coherently detects the IF signal I to produce baseband signals Bp and Bq which are respectively associated with the quadrature components of the IF signal I. The signals Bp and Bq are respectively sampled and shaped by the A/D converters 3 and 4 responsive to the clock signal $C_2$, thereby being converted to two sequences of data signals Dp and Dq.

As previously stated in relationship to FIG. 1, the tank circuit 204 of the circuit 21 has a clock output component. The DC voltage level of the clock component is adjusted by the bias voltage Vb which is superposed thereon and, then, is sampled by the flip-flop 211 which is timed to the clock signal $C_2$. The output terminal Q of the flip-flop 211 becomes a ONE if the sampled value is greater than a predetermined threshold value of the flip-flop 211 and a ZERO if the sampled value is below the threshold.

Figure 3:
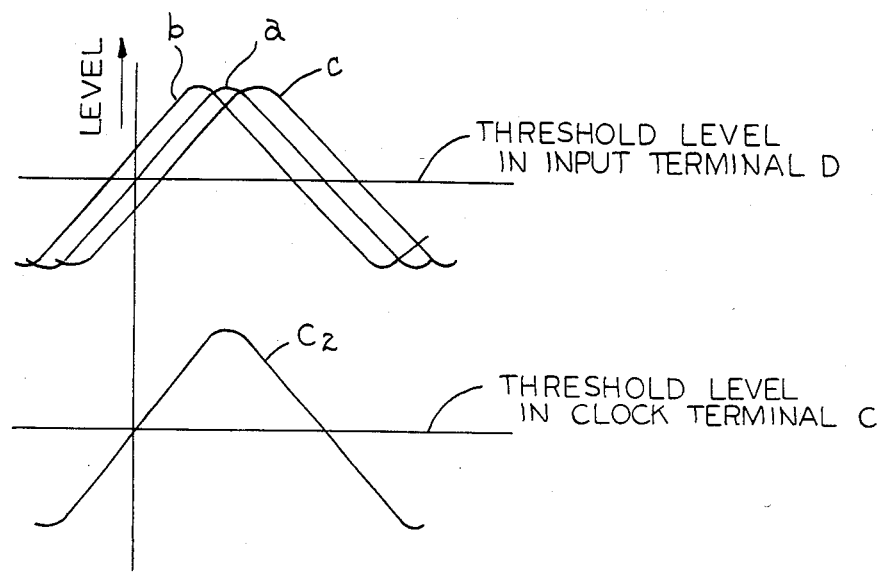
FIG. 3 shows waveforms which are useful for describing the operation of a flip-flop which is included in the circuit of FIG. 2.

FIG. 3 shows waveforms which are useful for describing the operation of the flip-flop 211 (FIG. 2). As the input at the input terminal D is varied, as represented by curves a, b and c, the output at the output terminal Q assumes logical values as shown in Table 1 below.

TABLE 1

| TERMINAL D INPUT | TERMINAL Q OUTPUT |
|---|---|
| a | ONE & ZERO WITH SAME PROBABILITY |
| b | ONE |
| c | ZERO |

The output at the terminal Q, therefore, represents a phase comparison characteristic which, in turn, is representative of a phase relationship between the input at the terminal D and the clock signal $C_2$. Consequently, if the Q output of the flip-flop 211 is applied via the LPF 207 to the VCO 208 as a control signal, the clock synchronizing circuit 21 of FIG. 2 will be normally operable as a clock synchronizing circuit.

In FIG. 3, it will be apparent that if the DC voltage level of the D input of the flip-flop 211 (FIG. 2) has been adjusted to the threshold level, the Q output remains unchanged despite any change in the clock component level of the D input. That is, the inventive sampling means (flip-flop 211) has a limiting function, in addition to the phase comparing function.

As described above, the clock synchronizing circuit 21 (FIG. 2), in accordance with the first embodiment, recovers the clock signal $C_2$ from the baseband signals Bp and Bq and suppresses jitter, which is contained in the signal $C_2$, by the limiting function of the flip-flop 211, as well as by the action of tank circuit 204 and LPF 207.

Figure 4:
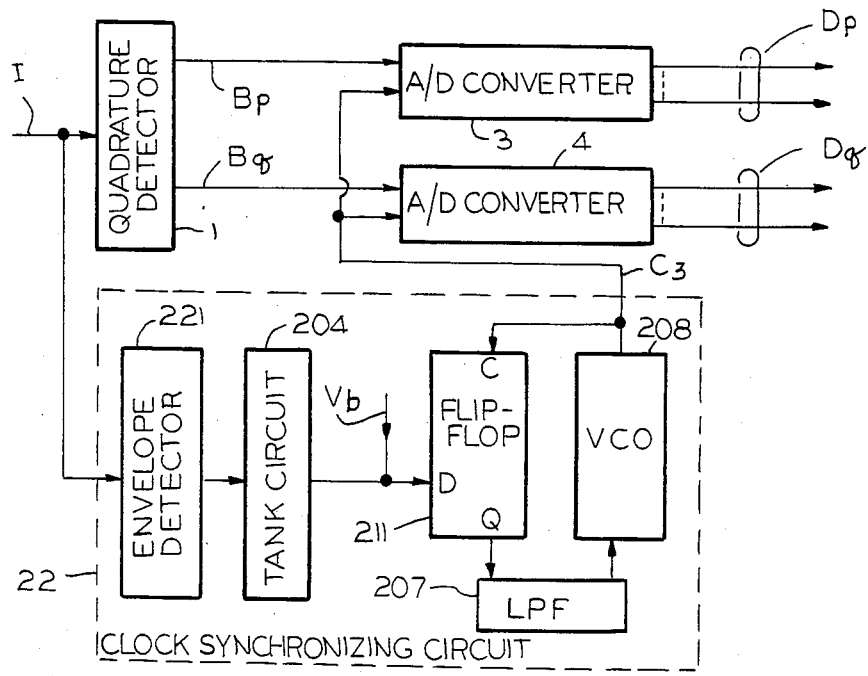
FIG. 4 is a demodulator to which a second embodiment of the present invention is applied.

FIG. 4 shows a demodulator to which a clock synchronizing circuit is applied in accordance with a second embodiment of the present invention. In FIG. 4, the structural elements which are the same as those of FIGS. 1 and 2 are designated by like reference numerals. As shown, the demodulator comprises a quadrature detector 1, an inventive clock synchronizing circuit 22 adapted to recover a clock signal $C_3$ from an IF signal I, and A/D converter 3 and 4 which are adapted to sample and shape baseband signals Bp and Bq in response to the clock signal $C_3$ to thereby produce data signals Dp and Dq.

The clock synchronizing circuit 22 includes an envelope detector 221 which is a substitute for the full-wave rectifiers 201 and 202 and adder 203 of FIG. 2.

From a digitally modulated IF signal, a clock component can be separated by subjecting it to envelope detection or by a similar non-linear operation. Thus, the envelope detector 221 separates a clock component from an IF signal I. Responsive to the clock component, each of the tank circuit 204, flip-flop 211, LPF 207 and VCO 208 function in the same manner, as discussed in relationship to the clock synchronizing circuit 21.

As discussed above, the clock synchronizing circuit 22 (FIG. 4), in accordance with the second embodiment, recovers the clock signal out of the IF signal I. The circuit 22, like the circuit 21, is successful in suppressing jitter to a minimum.

Generally, in a phase-locked loop which includes a limiter, the limiter serves as a high gain amplifier when an input signal is absent. In this condition, the influence of a leakage from the output of a VCO to the input of the limiter becomes substantial so that the oscillation frequency of the VCO is apt to deviate from its center oscillation frequency. For this reason, in an initial state where an input signal has been entered, the deviation between the frequency of the input signal and the oscillatin frequency of the VCO is so great that a substantial period of time is needed for pull-in, or tuning, to be completed.

Figure 5:
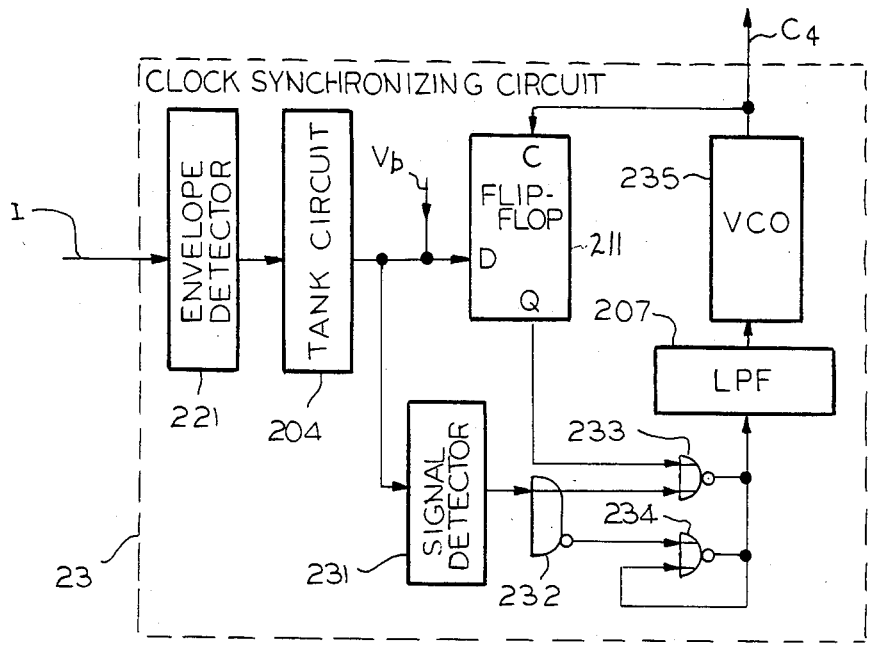
FIG. 5 is a block diagram showing a third embodiment of the present invention.

FIG. 5 incorporates another embodiment of the present invention which constitutes a solution to a problem of slow pull-in or tuning. In FIG. 5, a clock synchronizing circuit 23 comprises the structural elements of circuit 22 of FIG. 4. In addition, signal detector 231 has an output which becomes a ONE when an output of the tank circuit 204 is present and a ZERO if otherwise. An OR/NOR gate 232 is coupled to an output of the signal detector 231. A NOR gate 233 receives an OR output of the gate 232 and an output of the flip-flop 211. A NOR gate 234 is connected to a NOR output of the gate 232 and to its own output. The outputs of the NOR gates 233 and 234 are routed to the LPF 207. The circuit 23 further comprises a VCO 235 which is opposite in the polarity of control voltage to the VCO 208 of the circuit 22.

In operation, so long as the IF signal I digitally modulated in a normal manner and the tank circuit 204 produces a clock component (normal operation), the input to the OR/NOR gate 232 is ZERO so that the output of the NOR gate 234 is also a ZERO. The output of the NOR gate 233 is an inverted version of the output of the flip-flop 211. In this situation, the clock synchronizing circuit 23 is enabled to operate in the same manner as the previously discussed circuit 22. Conversely, while the clock output from the tank circuit 204 is absent, the input to the OR/NOR gate 232 is a ONE with the result that the output of the NOR gate 233 is a ZERO, which inhibits the output of the flip-flop 211. Meanwhile, because one of the inputs to the NOR gate 234 is a ZERO and the other input is its own output which is fed back, the output of the gate 234 is held at a certain constant value. This constant output of the gate 234 is substantially equal to a voltage which the NOR gate 233 produces in a normally operating condition. (If not equal, the output level of the NOR gate 234 is adjustable through an external circuit). The free oscillation frequency of the VCO 235 is, therefore, substantially equal to the frequency which would hold under a normally operating condition.

As described above, the clock synchronizing circuit 23, in accordance with the third embodiment of FIG. 5, operates in the same manner as the circuit 22 (FIG. 4) for as long as the IF signal I is digitally modulated in a normal manner. The tank circuit 204 does not produce a clock component for maintaining the frequency of the clock signal C4 at the free oscillation frequency of the VCO 235. This effectively cuts down the pull-in time.

Figure 6:
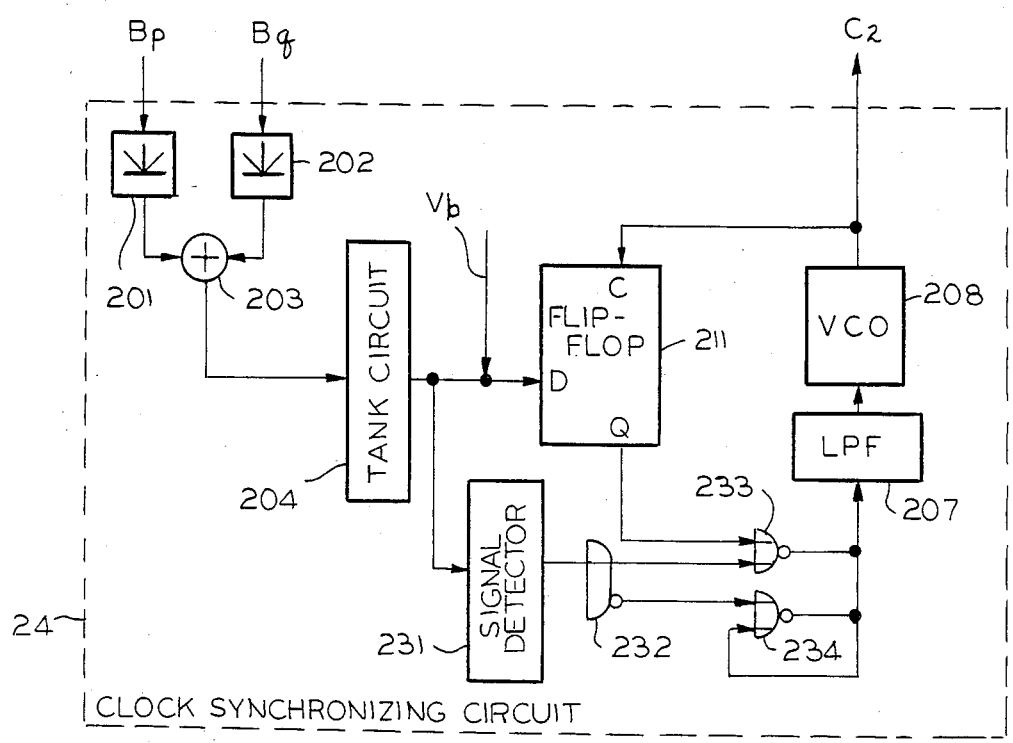
FIG. 6 is a block diagram showing a fourth embodiment of the present invention.

FIG. 6 shows a clock synchronizing circuit which recovers a clock signal from the baseband signals and shortens the pull-in time. In FIG. 6, the clock synchronizing circuit 24 comprises, in addition to the structural elements of the circuit 21 of FIG. 2, the signal detector 231, OR/NOR gate 232 and NOR gates 233 and 234, which are included in the circuit 23 of FIG. 5. The circuit 24 operates in the same manner that the circuit 23 operates.

While the present invention has been shown and described in relationship to a digital carrier transmission system, it will be apparent that it is similarly applicable to a digital baseband transmission system.

In summary, it will be seen that the present invention provides a clock synchronizing circuit with a minimum of jitter, without resorting to a high-speed IC gate and other expensive elements. This advantage is derived from the use of D-type flip-flop or a similar inexpensive sampling means which also functions as a limiter and a phase comparator.

Those who are skilled in the art will readily perceive how to modify the invention. Therefore, the appended claims are to be construed to cover all equivalent structures which fall within the true scope and spirit of the invention.

What is claimed is:

1. A clock synchronizing circuit comprising:
   first means for separating a clock component from a digital modulated wave and for filtering the clock component, thereby providing an analog clock component;
   second means comprising a digital flip-flop circuit responsive to a clock signal for sampling the analog clock component provided from said first means to produce a two-level digital signal; and
   voltage controlled oscillator means responsive to said two-level digital signal for generating said clock signal.

2. A clock synchronizing circuit as claimed in claim 1, wherein said first means comprises an envelope detector for envelope-detecting the digital modulated wave, and a tank circuit for filtering an output of said envelope detector.

3. A clock synchronizing circuit as claimed in claim 1, wherein said digital flip-flop circuit comprises a D-type flip-flop.

4. A clock synchronizing circuit as claimed in claim 1, further comprising a signal detector for detecting an output of said first means, and means responsive to an output of said signal detector for selectively applying an output of said second means and a given constant voltage to said voltage controlled oscillator means.

5. A clock synchronizing circuit as claimed in claim 1, wherein said digital modulated wave is a QAM wave.

6. A clock synchronizing circuit as claimed in claim 1, wherein said digital modulated wave is PSK wave.

7. A clock synchronizing circuit comprising:
   first means for separating a clock component from a demodulated signal of a digital modulated wave and for filtering the clock component, thereby providing an analog clock component;
   second means comprising a digital flip-flop circuit responsive to a clock signal for sampling the analog clock component provided from said first means to produce a two-level digital signal; and
   voltage controlled oscillator means responsive to said two-level digital signal for generating said clock signal.

8. A clock synchronizing circuit as claimed in claim 7, further comprising a quadrature detector for quadrature-detecting the digital modulated wave to produce the demodulated signal.

9. A clock synchronizing circuit as claimed in claim 8, wherein said first means comprises rectifier means for respectively full-wave rectifying two demodulated signals which are in an output of said quadrature detector, an adder for combining outputs of said rectifier means, and a tank circuit for filtering an output of said adder to provide said analog clock component.

10. A clock synchronizing circuit as claimed in claim 7, wherein said digital flip-flop circuit comprises a D-type flip-flop.

11. A clock synchronizing circuit as claimed in claim 8, further comprising analog-to-digital converter means for sampling the respectively demodulated signals from said quadrature detector to convert the demodulated signals to digital signals.

12. A clock synchronizing circuit as claimed in claim 7, further comprising a signal detector for detecting an output of said first means, and means responsive to an output of said signal detector for selectively applying an output of said second means and a given constant voltage to said voltage controlled oscillator means.

13. A clock synchronizing circuit as claimed in claim 7, wherein said digital modulated wave is a QAM wave.

14. A clock synchronizing circuit as claimed in claim 7, wherein said digital modulated wave is a PSK wave.

15. A clock synchronizing circuit comprising detector means responsive to a digital modulated wave for producing baseband signals, voltage controlled oscillator means responsive to a control signal for providing a clock signal, first means coupled to said detector means for producing an analog clock component from said digital modulated wave, second means comprising a digital flip-flop circuit connected to said voltage controlled oscillator means and said first means for sampling said analog clock component in response to said clock signal, and filtering means for providing said control signal in response to an output of said second means.

16. The circuit of claim 15 wherein said first means comprises a full-wave rectifier.

17. The circuit of claim 15 wherein said first means is an envelope detector.

18. The circuit of claim 17 and signal detector means coupled to an output of said envelope detector, said second means being a D-type flip-flop having a D input coupled to an output of said first means, a Q output coupled to an input of said filtering means, and a C input coupled to an output of said voltage controlled oscillator.

19. The circuit of claim 17 and signal detector means coupled to an output of said detector means, said second means being a D-type flip-flop having a D input coupled to an output of said first means, a Q output coupled to an input of said filtering means, and a C input coupled to an output of said voltage controlled oscillator.

20. A clock synchronizing circuit as claimed in claim 15, wherein said digital modulated wave is a QAM wave.

21. A clock synchronizing circuit as claimed in claim 15, wherein said digital modulated wave is PSK wave.

* * * * *